United States Patent
Mattson et al.

(10) Patent No.: US 6,662,898 B1
(45) Date of Patent: Dec. 16, 2003

(54) TIRE SIDE SLIP ANGLE CONTROL FOR AN AUTOMOTIVE VEHICLE USING STEERING ACTUATORS

(75) Inventors: Keith Glenn Mattson, Livonia, MI (US); Todd Allen Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,424

(22) Filed: Oct. 16, 2002

(51) Int. Cl.[7] ................................................ B62D 5/04
(52) U.S. Cl. ...................... 180/446; 180/443; 180/402; 701/41
(58) Field of Search ................................ 180/402, 443, 180/446; 701/41, 42; 280/5.51

(56) References Cited

U.S. PATENT DOCUMENTS

| | | | |
|---|---|---|---|
| 4,767,588 A | | 8/1988 | Ito |
| 4,951,198 A | | 8/1990 | Watanabe et al. |
| 4,967,865 A | | 11/1990 | Schindler |
| 5,088,040 A | | 2/1992 | Matsuda et al. |
| 5,261,503 A | | 11/1993 | Yasui |
| 5,278,761 A | | 1/1994 | Bnder et al. |
| 5,365,439 A | | 11/1994 | Momose et al. |
| 5,579,245 A | | 11/1996 | Kato |
| 5,627,754 A | * | 5/1997 | Asanuma et al. ..... 364/424.051 |
| 5,648,903 A | | 7/1997 | Liubakka |
| 5,694,319 A | | 12/1997 | Suissa et al. |
| 5,729,107 A | * | 3/1998 | Shimizzu et al. ........... 318/489 |
| 5,765,118 A | * | 6/1998 | Fukatani ...................... 701/72 |
| 5,907,277 A | * | 5/1999 | Tokunaga ................... 340/441 |
| 5,925,083 A | * | 7/1999 | Ackermann .................. 701/41 |
| 5,996,724 A | * | 12/1999 | Shimizu et al. ............. 180/446 |
| 6,079,513 A | | 6/2000 | Nishizaki et al. |
| 6,184,637 B1 | | 2/2001 | Yamawaki et al. |
| 6,219,604 B1 | | 4/2001 | Dilger et al. |
| 6,263,261 B1 | | 7/2001 | Brown et al. |
| 6,405,113 B1 | * | 6/2002 | Yamawaki et al. ........... 701/41 |

OTHER PUBLICATIONS

Yasuo Shimizu, Toshitake Kawai, Junji Yuzuriha: Improvement in Driver–Vehicle System Performance by Varying Steering Gain with Vehicle Speed and Steering Angle: VGS (Variable Gear–Ratio Steering System) SAE Technical Paper 1999–01–0395.

* cited by examiner

Primary Examiner—Lesley D. Morris
Assistant Examiner—Tony Winner
(74) Attorney, Agent, or Firm—Artz & Artz; Gary A. Smith

(57) ABSTRACT

A stability control system (24) for an automotive vehicle includes a plurality of sensors sensing the dynamic conditions of the vehicle. The controller (26) is coupled to the sensors. The controller (26) determines a road surface coefficient of friction, calculates a maximum slip angle based on the road surface coefficient of friction, determines a calculated side slip angle in response to measured dynamic vehicle conditions, and reduces a steering wheel actuator angle when the calculated side slip angle is greater than the maximum slip angle.

20 Claims, 6 Drawing Sheets

TIRE SIDE SLIP ANGLE CONTROL FOR AN AUTOMOTIVE VEHICLE USING STEERING ACTUATORS

CROSS REFERENCE TO RELATED APPLICATIONS

The present application is related to application Ser. No. 10/065,425 entitled "Tire Side Slip Angle Control For An Automotive Vehicle Using Steering Peak Seeking Actuators", filed simultaneously herewith and incorporated by reference herein.

BACKGROUND OF THE INVENTION

The present invention relates generally to a dynamic behavior control apparatus for an automotive vehicle, and more specifically, to a method and apparatus for controlling the tire side slip angle of the vehicle by controlling the road wheel steering direction of the vehicle.

Dynamic control systems for automotive vehicles have recently begun to be offered on various products. Antilock braking systems (ABS) and traction control (TC) control tire slip ratios. Other dynamic control systems control the side slip angle and yaw response of the vehicle by controlling the tractive forces and/or braking torque at the various wheels of the vehicle. Side slip and yaw control systems typically compare the desired direction, yaw response and lateral acceleration of the vehicle based upon the steering wheel angle, speed, and the direction of travel to an ideal (stable) vehicle model. By regulating the amount of braking torque and tractive friction at each corner of the vehicle, the desired path of travel and yaw rate may be maintained.

When operating the vehicle a large lateral slip angle can occur at the front wheels during severe understeer and oversteer events. The lateral force generated from a tire typically reaches a maximum value $F_{latmax}$ the slip angle referred to as the slip angle at peak lateral force. The maximum lateral force then decreases or levels off as the slip angle increases further. The leveling off is commonly referred to as the saturation region. One problem with using brake effort to control the lateral dynamics and response of the vehicle is that the yaw moment is controlled without direct control of the lateral forces. This direct control cannot be accomplished using a braking system. However, lateral forces can be controlling using the vehicle steering system.

In particular, it would be desirable to provide a system that allows the lateral dynamics and response yaw of the vehicle to be controlled near the maximum lateral force, to maintain maximum control of the vehicle.

SUMMARY OF INVENTION

The present invention utilizes a steering system such as a steer-by-wire system that can change the relationship of the road wheel angle to the steering wheel angle. One goal would be to operate close to a maximum lateral force $F_{lat}$max, when the vehicle is operated near the limits of its lateral dynamics.

In one aspect of the invention, a stability control system for an automotive vehicle includes a plurality of sensors sensing the dynamic conditions of the vehicle. A controller is coupled to the sensors. The controller determines an estimated road surface coefficient of friction, calculates the maximum lateral force slip angle of the tire $\alpha_{mp}$, based on the estimated road surface coefficient of friction and vehicle configuration, determines a calculated side slip angle $\alpha$ in response to measured dynamic vehicle conditions, and reduces a steering wheel actuator angle when the calculated side slip angle is greater than the maximum tire slip angle, $\alpha_{mp}$.

In a second aspect of the invention, a stability control system for an automotive vehicle includes a plurality of sensors sensing the dynamic conditions of the vehicle. The controller is coupled to the sensors. The controller determines a lateral force in response to measured vehicle conditions, determines a slip angle in response to measured vehicle conditions, determines a first steering actuator angle change, and, in the case of lateral saturation ($\alpha > \alpha_p$) decreases the slip angle until the lateral force increases. This peak-seeking approach searches for the optimal slip and, determines a second steering actuator angle change to increase the slip angle until the lateral force decreases, then iterates upon $F_{latmax}$, hence $\alpha_p$.

In a third aspect of the invention, a method of controlling a vehicle having a steering actuator comprises determining a road surface coefficient of friction; calculating a maximum permissible slip angle based on the road surface coefficient of friction; determining a calculated side slip angle in response to measured dynamic vehicle conditions; and reducing a steering wheel actuator angle when the calculated side slip angle is greater than the maximum permissible slip angle.

In a fourth aspect of the invention, a method of controlling a vehicle having a steering actuator comprises determining a lateral force in response to measured vehicle conditions; determining a slip angle in response to measured vehicle conditions; determining a first steering actuator angle change to decrease the slip angle until the lateral force increases; controlling the steering actuator in response to the first steering actuator change angle; thereafter, determining a second steering actuator angle change to increase the slip angle until the lateral force decreases; and controlling the steering actuator in response to the second steering actuator change angle.

One advantage of the invention is that such systems may be easily implemented into a steer-by-wire system. Another advantage is that the slip angle corresponding to the peak lateral force is independent of tire, loading, and in some cases of the surface coefficient of friction.

Other advantages and features of the present invention will become apparent when viewed in light of the detailed description of the preferred embodiment when taken in conjunction with the attached drawings and appended claims.

DETAILED DESCRIPTION

The present invention is intended for use with yaw control systems implemented with electronically controlled and/or electrically actuated steering systems in automotive vehicles. However, the invention could easily be adapted for use in other vehicle systems such as active tilt control, rollover control or active suspension control. The present invention is described with respect to a front steered vehicle, but the teachings herein may be applied to rear or four wheel steering systems.

Figure 1:
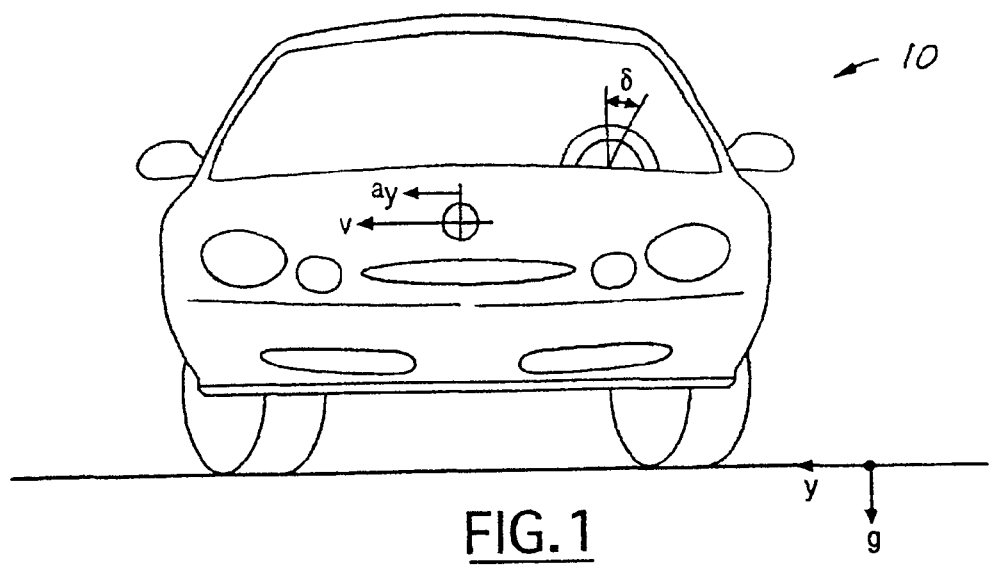
FIG. 1 is a front view of a motor vehicle illustrating various operating parameters of a vehicle experiencing a turning maneuver.
Figure 2A:
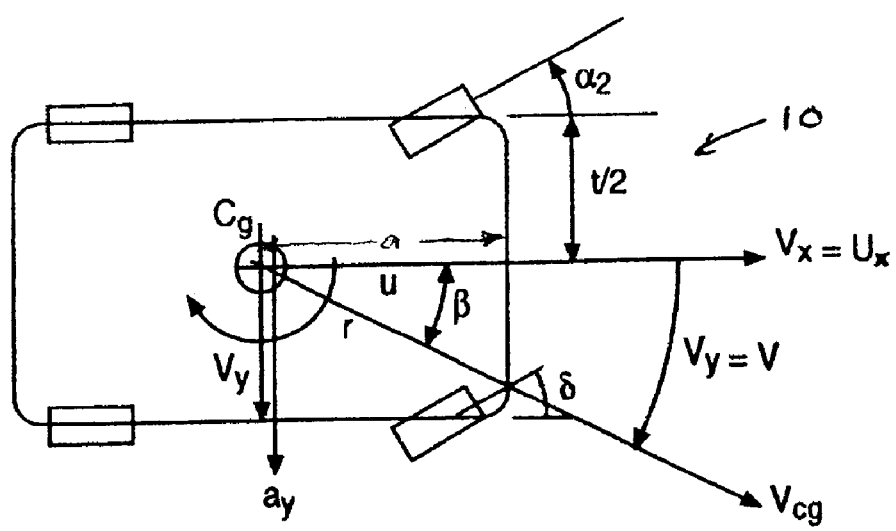
FIG. 2A is a top view of a motor vehicle illustrating various operating parameters of a vehicle experiencing a turning maneuver.
Figure 2B:
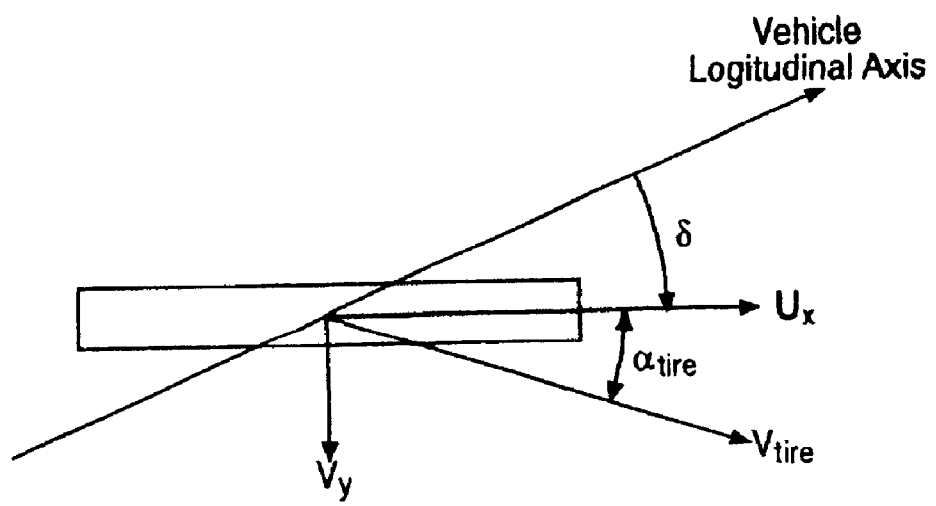
FIG. 2B is a top view of a tire illustrating the forces thereon.

Referring now to FIGS. 1, 2A and 2B, various operating parameters and variables used by the present invention are illustrated as they relate to the application of the present invention to a ground based motor vehicle 10. Those skilled in the art will immediately recognize the basic physics represented by these illustrations, thereby make the adaptation to different types of vehicles easily within their reach. Lateral acceleration is represented by $a_y$, longitudinal acceleration is represented by $a_x$, yaw rate is represented by r, and the steering wheel angle is $\delta$.

Figure 3:
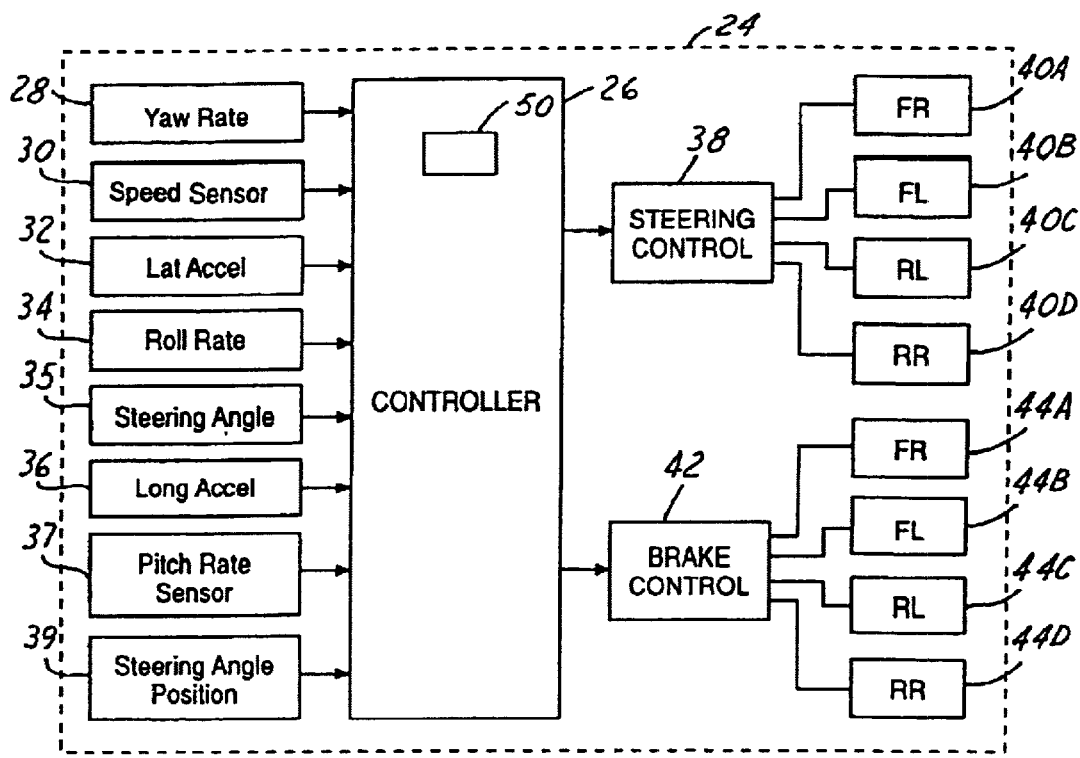
FIG. 3 is a block diagram showing a portion of a microprocessor interconnected to sensors and controlled devices which may be included in a system according to the present invention.

Referring now to FIG. 3, stability control system 24 has a controller 26 used for receiving information from a number of sensors which may include a yaw rate sensor 28, a speed sensor 30, a lateral acceleration sensor 32, a roll rate sensor 34, a steering angle sensor 35, a longitudinal acceleration sensor 36, a pitch rate sensor 37 steer. A steering angle position sensor 39 may also be included. Sensor 39 provides feedback as to the position of the steered position of the road wheel. Lateral acceleration, longitudinal acceleration, yaw rate, roll orientation and speed may be obtained using a global positioning system (GPS). Based upon inputs from the sensors, controller 26 controls the road wheel steering angle. Note that this will be possible without affecting the driver's steering wheel angle. Depending on the desired sensitivity of the system and various other factors, not all the sensors 28–39 may be used in a commercial embodiment. Other factors may be obtained from the sensors such as the coefficient of friction (or surface mu, $\mu$), lateral force at the tires $F_{lat}$ and the side slip angle.

Roll rate sensor 34 and pitch rate sensor 37 may sense the roll condition for a rollover system of the vehicle based on sensing the height of one or more points on the vehicle relative to the road surface. The rollover system may use the teachings herein to prevent a vehicle from rolling over. Sensors that may be used to achieve this include a lidar or radar-based proximity sensor, a laser-based proximity sensor and a sonar-based proximity sensor.

Roll rate sensor 34 and pitch rate sensor 37 may also sense the roll condition based on sensing the linear or rotational relative displacement or displacement velocity of one or more of the suspension chassis components which may include a linear height or travel sensor, a rotary height or travel sensor, a wheel speed sensor, a steering wheel position sensor, a steering wheel velocity sensor and a driver heading command input from an electronic component that may include steer by wire using a hand wheel or joy stick.

Roll sensing may also be achieved by sensing the force or torque associated with the loading condition of one or more suspension or chassis components including a pressure transducer in an active suspension, a shock absorber sensor such as a load cell, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor.

Speed sensor 30 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity (V_CG). Various other algorithms are known to those skilled in the art. Speed may also be obtained from a transmission sensor. For example, if speed is determined while speeding up or braking around a corner, the lowest or highest wheel speed may be not used because of its error. Also, a transmission sensor may be used to determine vehicle speed.

The roll sensing of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an opticalbased speed sensor.

Steering control 38 may control a position of the front right wheel actuator 40A, the front left wheel actuator 40B, the rear left wheel actuator 40C, and the right rear wheel actuator 40D. Although, as described above, two or more of the actuators may be simultaneously controlled as one actuator. For example, in a conventional rack-and-pinion system, the two front wheels coupled thereto are simultaneously controlled. A rack and pinion type system may also provide rear steering. Based on the inputs from sensors 28 through 39, controller 26 determines a roll condition and controls the steering position of the wheels. This allows an added degree of freedom between the steering wheel and road wheel actuators.

Controller 26 may also use brake control 42 coupled to front right brakes 44A, front left brakes 44B, rear left brakes 44C, and right rear brakes 44D. By using brakes in addition to steering control some control benefits may be achieved. For example yaw control and rollover control may be accomplished. That is, controller 26 may be used to apply a brake force distribution to the brake actuators in a manner described in U.S. Pat. No. 6,263,261 which is hereby incorporated by reference.

Figure 4:
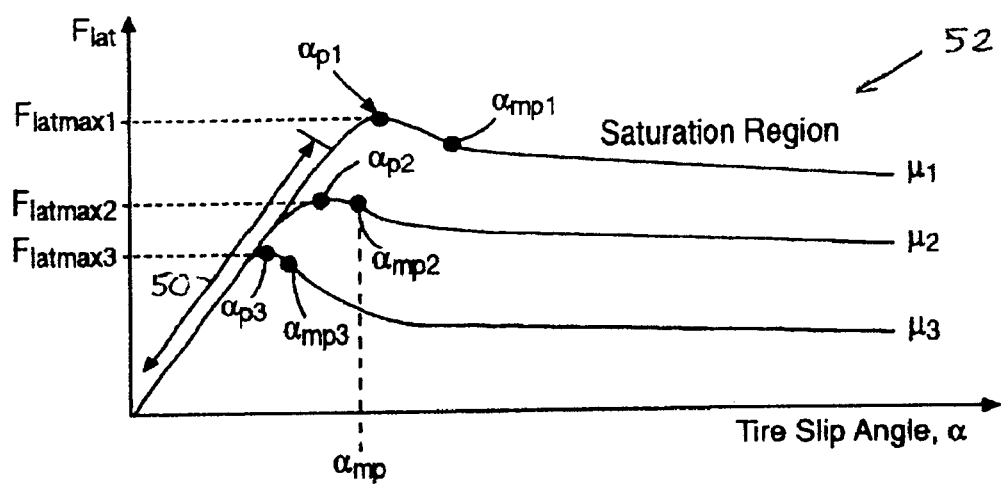
FIG. 4 is a plot of lateral force versus slip angle for three coefficient of friction values.

Referring now to FIG. 4, a plot of lateral force $F_{lat}$ versus slip angle $\alpha$ is plotted for three surface coefficients $\mu_1, \mu_2$ and $\mu_3$. In each of the cases, the lateral force that a tire generates increases linearly in the linear region 50 then reaches a peak value $\alpha_{p1}$. Thereafter, as $\alpha$ increases further, the lateral force decreases in the saturation region 52. The maximum lateral force $F_{latmax}$ corresponds to a peak slip angle $\alpha_{p1}$ as can be seen to generate the maximum lateral force. Therefore, to generate the most lateral force for a steered wheel for the case of $\mu$, it is best to operate as close to $\alpha_{p1}$ as possible. The present invention provides beneficial consequences in an understeering situation where the front tires are saturated, i.e., limit handling. For example, if the vehicle is understeering, the radius of curvature is larger than that intended by the driver. In the case of limit handling when $\alpha > \alpha_p$, a reduction in the front wheel slip angle to $\alpha_{p1}$ may be made by modifying the front steering angle by a predetermined amount, thus increasing the lateral force generation of the front tire and thus decreasing the amount of understeer and radius of curvature and thus the amount of understeering.

As can be seen by the plot in FIG. 4, various surface $\mu$'s change the point of peaks $\alpha_{p1}, \alpha_{p2}$, and $\alpha_{p3}$.

Another location on the $\mu$ plot is a maximum permissible angle $\alpha_{mp1}$. The maximum permissible angle $\alpha_{mp1}$ corresponds to the maximum angle desired in the first embodiment of the invention (i.e., when the tire is saturated, and it is desired to decrease $\alpha$). The maximum permissible angle $\alpha_{mp1}$ has a slide slip angle greater than the peak value and therefore has a lower corresponding lateral force. In the first embodiment the side slip angle is maintained between the maximum permissible angle $\alpha_{mp1}$ and the peak angle $\alpha_{p1}$. As will be further discussed below, the maximum permissible angle $\alpha_{mp1}$ is moved closer to the peak value during operation.

The tire side slip angle α may be calculated during operation of the vehicle from various sensors. The tire slip angle α is defined as the angle between the heading of the wheel and the path of the wheel. This is best shown in FIG. 2B. That is, $$\alpha_{tire} = \left(\frac{v_{ytire}}{u_{xtire}}\right)$$

where, $v_{tire}$=lateral velocity of tire
$u_{tire}$=longitudinal velocity of tire along longitudinal axis (heading of tire(.)
$\alpha_{tire}$=tire slip angle $$\alpha = \tan^{-1}\left(\frac{v_{ytire}}{u_{xtire}}\right)$$

Experimentally, $v_y$ and $u_x$ are calculated as follows: to generalize, the equation below has + or sign depending if left or right tires is being determined.

$$v_{ytire} = (v_{yveh} \pm |a\ a|)\cos\delta + \left(u_{xveh} + \frac{t}{2}\right)\sin\delta$$

$$u_{xtire} = \left(v_{yveh} \pm \frac{t}{2}\Gamma\right)\cos\delta + (v_{veh} + \pm |a\ a|)\sin\delta$$

$\delta$ = tire steer angle
$u_x$ = longitudinal velocity of vehicle at center of gravity
$v_y$ = lateral velocity of vehicle at center of gravity
$\Gamma$ = yaw rate of vehicle (rotation rate about vertical axis)
$t$ = tread (track) width of vehicle (lateral distance between wheels)
$a$ = longitudinal distance from vehicle center of gravity to axle of wheel (along vehicle axis)

where $v_x$ and $v_y$ are the longitudinal and lateral velocities of the center of gravity of the vehicle, measured in the body fixed x and y directions.

Figure 5:
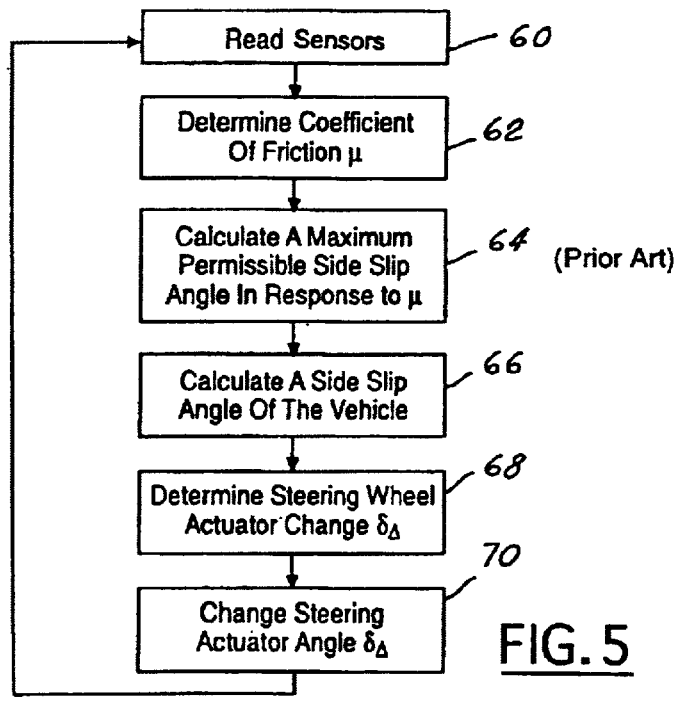
FIG. 5 is a logic flow block diagram in accordance with a first embodiment of the present invention.

Referring now to FIG. 5, a first embodiment of the present invention is illustrated. In this embodiment, the sensors are read in step 60. These sensors may include each of the sensors or some of the sensors shown in FIG. 3. From these sensors a coefficient of friction for the road surface is determined in step 62. One example of a formula for determining the coefficient of friction for the road surface is given by the formula:

$$\mu = \frac{a_{y\,max}}{g} \text{ or } \frac{a_{x,max}}{g} \text{ for braking.}$$

By determining the coefficient of friction a maximum permissible tire slip angle $\alpha_{mp1}$ is calculated in step 64. Those skilled in the art will recognize that the maximum permissible tire slip angle may be determined experimentally, analytically, or a combination of the two. In vehicle or adaptive algorithms may also be used. In step 66 a side slip angle α is determined from the sensors read in step 60.

Controller 26 changes the steering road wheel actuator position in direct response to the hand wheel angle. In the present application, the steering actuator is preferably a steer-by-wire system that in addition to hand wheel input provides some input to prevent exceeding a predetermined slip angle to maximize control of the vehicle.

A steering wheel actuator change $\delta_A$ is an angle determined in step 68 based upon the calculated side slip angle and the maximum permissible slip angle calculated in step 64. That is, if the calculated side slip angle is greater than the maximum permissible side slip angle, the steering wheel actuator position is changed in step 70 by the amount $\delta_A$. Because the process is an iterative process, step 60 is again repeated. That is, because the road conditions are constantly changing new coefficients of friction, maximum permissible side slip angles, and steering angle changes must be constantly updated to allow the maximum permissible side slip angle to approach the peak value $\alpha_p$. This method is continued until the calculated side slip angle is approximately equal to the maximum permissible side slip angle $\alpha_{mp}$ or the driver commands a decreased steering angle resulting in the calculated side slip angle being less than the maximum permissible side slip angle $\alpha_{mp}$.

It should be noted that the steering actuator change $\delta_A$ is independent of the change in the hand wheel of the automotive vehicle as long as the driver's input would result in $\alpha > \alpha_{mp}$. That is, the change calculated in step 60–70 are made in addition to the changes made by the hand wheel. By constantly monitoring the steering angle, the steering actuator change $\delta_A$ may be extremely large to compensate for any change in the hand wheel by the vehicle operator. It should also be noted that this process also may be performed with front steering or rear steering or independently controlled steering actuators within an automotive vehicle.

Figure 6:
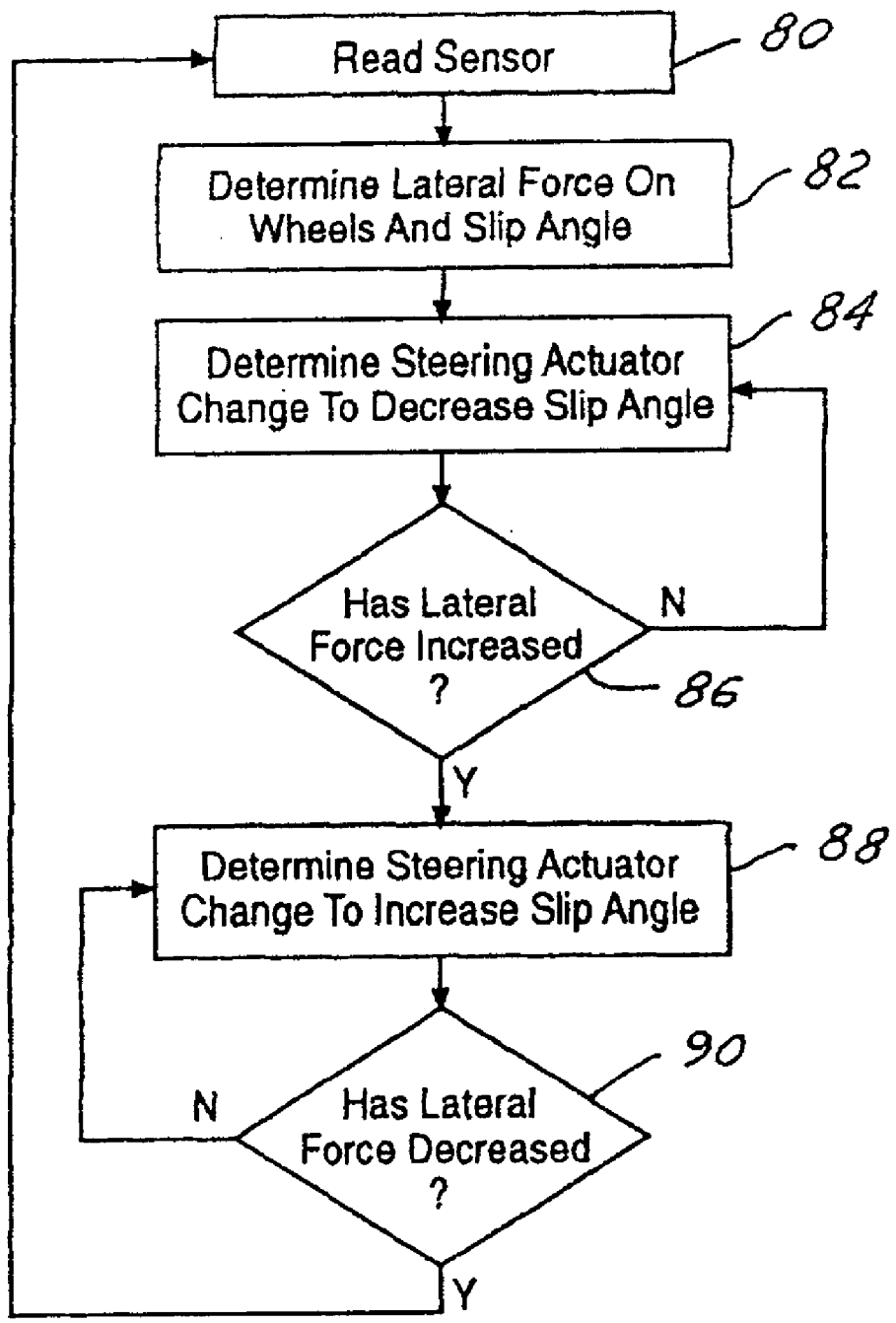
FIG. 6 is a logic flow block diagram in accordance with a second embodiment of the present invention.

Referring now to FIG. 6, the process may also monitor the lateral force $F_{lat}$ and determine a steering change thereby. In step 80, the sensors are read in a similar manner to that of step 60. The various sensors may include all or some of the sensors shown in FIG. 3. In step 82, the lateral force on the wheels and the side slip angle is calculated from the sensors read in step 80. The lateral force may be calculated using a filtered lateral acceleration signal $a_y$. That is, F=m$a_y$.

In step 84, a steering actuator change angle is calculated to decrease the slip angle of the tire. In step 86, the lateral force is recalculated to determine if it has increased. If the lateral force has not increased, step 84 is again repeated. In step 86 if the lateral force has increased, step 88 is executed. In step 88, the steering actuator change is determined to increase the slip angle. In step 90, the lateral force is checked to determine if it has decreased. If the lateral force has not decreased, then step 88 is again executed. In step 90 if the lateral force has decreased, the process is repeated in step 80.

As can be seen, the method set forth in FIG. 6 constantly monitors the lateral force on the vehicle. Thus, it can be said that FIG. 6 provides a peak-seeking method so that the peak $\alpha_p$ corresponding to the maximum lateral force $F_{latmax}$ is achieved. It should also be noted that this second method is not dependent on tire and vehicle parameter changes, radial loading, camber angle changes, tire pressure and wear, and changes in the slip angle. Thus, by constantly monitoring the lateral force the slip angle will constantly be centered around the peak slip angle $\alpha_p$. Note this will be continued as long as the driver commanded α (without control) is greater than $\alpha_p$. The vehicle stability (yaw and vehicle side slip) are continually monitored to maintain stability.

In operation of both methods, various types of steering control through various control signals may be performed depending on the vehicle characteristics and the steering system. For example, as described above a rack and pinion system may be controlled to provide a desired change in the rear steering angle using a rear control signal temporarily while leaving the front wheels unchanged. Of course, the direction of the front wheels using a front control signal could also be changed when the rear direction is changed.

In a system having independently actuable front wheels, the relative steering angle between the front wheels may be changed by steering control 38 without changing the position or controlling the position of the rear wheel. This may be done by independent control of the front wheels or simultaneous control of the front wheels. Each wheel in an independent system may respond to a respective front right, front left, rear right, or rear left control signal.

In a system having independently actuable rear wheels, the relative steering angle between the front wheels may be changed in response to detected roll by steering control 38 without changing the position or controlling the position of the front wheels. This may be done by independent control of the rear wheels or simultaneous control of the rear wheels.

While particular embodiments of the invention have been shown and described, numerous variations and alternate embodiments will occur to those skilled in the art. Accordingly, it is intended that the invention be limited only in terms of the appended claims.

What is claimed is:

1. A control system for an automotive vehicle having a steering actuator comprising:

a plurality of sensors generating a plurality of signals corresponding to measured dynamic vehicle conditions; and a controller coupled to the plurality of sensors, said controller determines a road surface coefficient of friction, calculates a maximum permissible slip angle based on the road surface coefficient of friction, determines a calculated side slip angle in response to measured dynamic vehicle conditions, and reduces a steering wheel actuator angle when the calculated side slip angle is greater than the maximum slip angle.

2. A system as recited in claim 1 wherein said steering actuator comprises a front right wheel actuator and a front left wheel actuator.

3. A system as recited in claim 2 wherein said front right wheel steering actuator and said front left steering actuator are independently controllable.

4. A system as recited in claim 3 wherein said controller generates a front right control signal and a front left control signal in reducing the steering wheel actuator angle.

5. A system as recited in claim 1 wherein said steering actuator comprises a rear steering actuator and a front steering actuator.

6. A system as recited in claim 1 wherein said controller determines a rear steering control signal in reducing the steering wheel actuator angle.

7. A method of controlling a vehicle having a steering actuator comprising:

determining a road surface coefficient of friction;

calculating a maximum permissible slip angle based on the road surface coefficient of friction;

determining a calculated side slip angle in response to measured dynamic vehicle conditions; and reducing a steering wheel actuator angle when the calculated side slip angle is greater than the maximum permissible slip angle.

8. A method as recited in claim 7 wherein reducing comprises reducing a steering wheel actuator angle when the calculated side slip angle is greater that the maximum slip angle until the calculated side slip angle is substantially equal to the maximum slip angle.

9. A method as recited in claim 7 wherein reducing comprises reducing a steering wheel actuator angle independent from a steering hand wheel when the calculated side slip angle is greater that the maximum permissible slip angle.

10. A method as recited in claim 7 wherein determining a calculated side slip angle in response to measured dynamic vehicle conditions comprises measuring a lateral acceleration, wheel speed, yaw rate and steering wheel angle.

11. A method as recited in claim 7 wherein the maximum slip angle is greater than a peak slip angle.

12. A method as recited in claim 7 wherein reducing a steering wheel actuator angle is performed independent of the handwheel position.

13. A method as recited in claim 7 wherein reducing a steering wheel actuator angle is performed in addition to the handwheel position.

14. A method as recited in claim 7 wherein reducing a steering wheel actuator angle when the calculated side slip angle is greater that the maximum slip angle comprises controlling a front steering actuator.

15. A method as recited in claim 7 wherein reducing a steering wheel actuator angle when the calculated side slip angle is greater that the maximum slip angle comprises controlling a rear steering actuator.

16. A method as recited in claim 7 wherein reducing a steering wheel actuator angle when the calculated side slip angle is greater that the maximum slip angle comprises controlling a front right steering actuator.

17. A method as recited in claim 7 wherein reducing a steering wheel actuator angle when the calculated side slip angle is greater that the maximum slip angle comprises controlling a front left steering actuator.

18. A method of controlling a vehicle having a steering actuator comprising:

determining a road surface coefficient of friction;

calculating a maximum permissible slip angle and a peak slip angle based on the road surface coefficient of friction;

determining a calculated side slip angle in response to measured vehicle conditions; and controlling a steering wheel actuator angle to maintain the calculated side slip angle between the peak side slip angle and the maximum permissible slip angle.

19. A method as recited in claim 18 wherein the maximum permissible slip angle is greater than the peak slip angle.

20. A method as recited in claim 18 wherein controlling a steering wheel actuator angle comprises reducing the steering wheel actuation angle when the steering angle is less than the peak slip angle.

* * * * *